Aug. 12, 1969 P. E. CROOKSHANKS ET AL 3,461,225
SERVICE AID FOR COLOR TELEVISION RECEIVER
Filed May 23, 1966
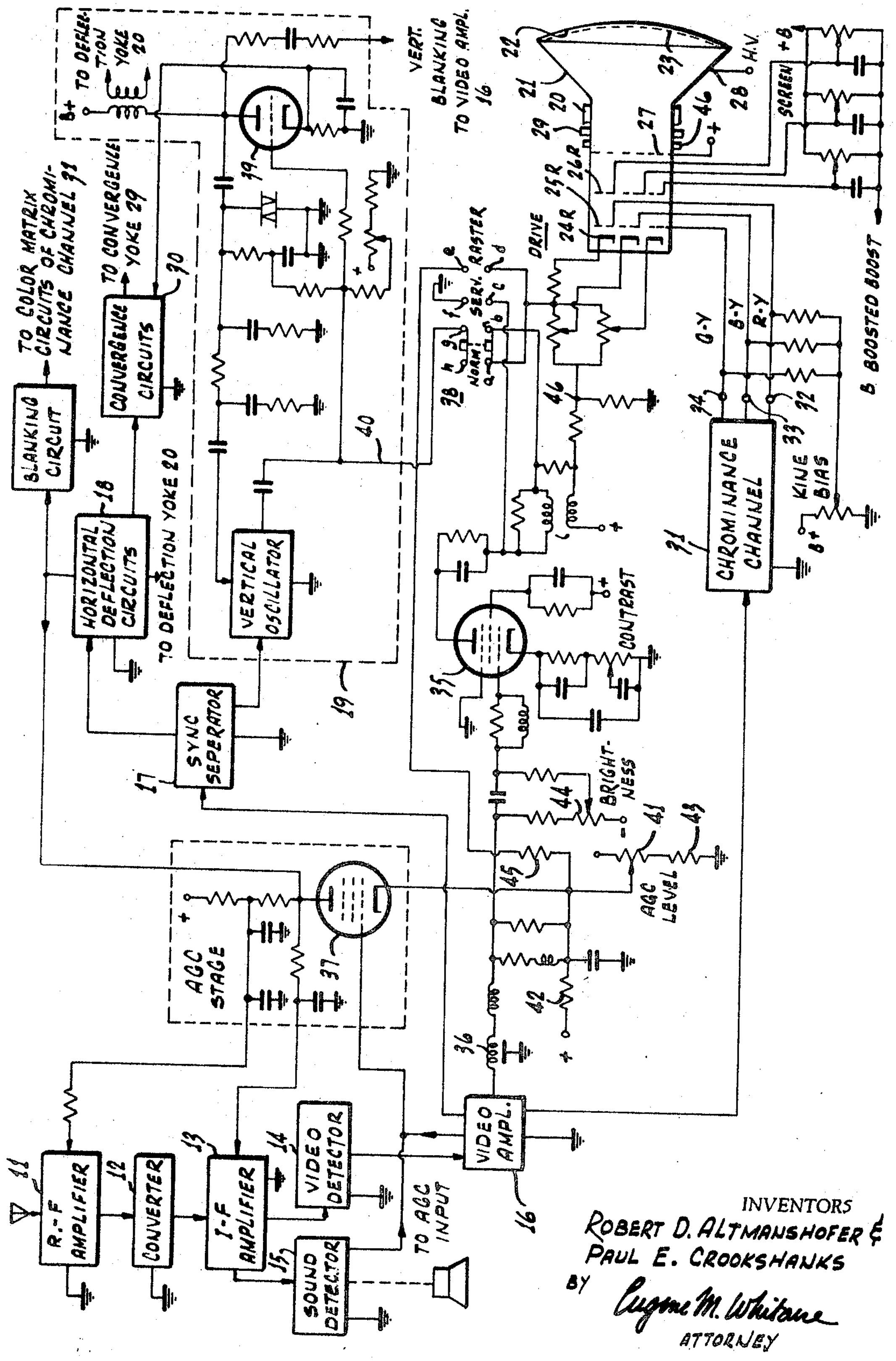
INVENTORS
ROBERT D. ALTMANSHOFER &
PAUL E. CROOKSHANKS
BY Eugene M. Whitacre
ATTORNEY United States Patent Office 3,461,225
Patented Aug. 12, 1969

3,461,225
SERVICE AID FOR COLOR TELEVISION RECEIVER

Paul Edward Crookshanks and Robert Dale Altmanshofer, Indianapolis, Ind., assignors to RCA Corporation, a corporation of Delaware Filed May 23, 1966, Ser. No. 552,026
Int. Cl. H04n 5/38, 5/44
U.S. Cl. 178—5.4 7 Claims

ABSTRACT OF THE DISCLOSURE

A color television receiver is provided with a service switch including "NORMAL," "SERVICE" and "RASTER" positions, the latter being provided for purity and grey scale tracking adjustment and checking. In the "RASTER" position, an AGC stage is operated so as to cut off R-F and I-F amplifiers in the receiver so as to produce a blank raster and blanking signals. The brightness of the raster is variable for grey scale tracking.

This invention relates to color television receivers, and more particularly to apparatus for facilitating the servicing and set-up of a color kinescope therein.

In color television receivers of the type employing a multigun color kinescope such as the well known three gun shadow mask color kinescope, a plurality of circuit controls are provided and a number of adjustments of such controls as well as adjustments of the electromagnetic deflection yoke associated with the color kinescope are required in order to obtain faithful reproduction of color images.

To provide optimum operation of the color kinescope, the controls associated with the kinescope are adjusted in accordance with what is commonly referred to as a set-up procedure. A first adjustment which is required is generally referred to as the "purity" adjustment. As used in connection with adjusting a three color kinescope, the term purity relates to the degree of freedom of one color from dilution by one or both of the other two colors. The purity adjustment is accomplished by positioning of the electromagnetic deflection yoke and adjustment of the purity magnet assembly so as to locate the deflection center of the three electron beams to restrict each of such beams to impinge substantially upon only a single predetermined one of the three phosphors arranged on the kinescope screen.

The set-up procedure is further directed towards making color temperature adjustments, taking into account the difference in cut-off potentials of the several electron guns, differences in the cathode emission of the several guns, and differences in the efficiencies of the several phosphors. That is, it is desired that the color kinescope reproduce desired colors at all points in the phosphor screen and furthermore that it reproduce white information with the proper color temperature at all brightness levels between minimum and maximum white, with the maximum white level being produced at the highest achievable level of brightness consistent with good image clarity.

The present invention is directed to servicing aids for facilitating the above-mentioned set-up adjustments without the need for external complex electronic test equipment.

In accordance with the invention, switching apparatus is incorporated in the receiver to selectively switch the receiver to a normal operating condition, to a service condition for permitting adjustment of the electron guns of the kinescope, and to a purity adjustment condition for facilitating final location and adjustment of the deflection yoke and purity magnet assemblies. By use of such switching apparatus, proper set-up adjustments may be achieved at any time without concern for the nature of the program material available and with an accuracy difficult to match by set-up procedures effected with reliance on the display of broadcast program material.

Accordingly, it is an object of the present invention to provide novel and improved color television receiver apparatus for facilitating the adjustment and set-up of the color kinescope.

The novel features that are considered characteristic of this invention are set forth with particularity in the appended claims. The invention itself, however, both as to its organization and method of operation as well as additional objects thereof will best be understood from the following description when read in connection with the accompanying drawing.

In the drawing, a color television receiver is illustrated which comprises the usual front end structure including an R-F amplifier 11, a converter 12, an I-F amplifier 13, a video detector 14 and a sound detector 15. Additional parts of the conventional sound reproducing system form no part of the present invention and are therefore not shown. The detected composite color television signal output of the video detector 14 is applied to a video amplifier 16 including one or more stages of amplification and having a plurality of separate outputs. One of the outputs of video amplifier 16 is applied to a sync separator 17 for recovery of the deflection synchronizing components of the composite signal which synchronizing components are applied to the usual horizontal and vertical deflection circuits 18 and 19 respectively. The deflection circuits serve to develop suitable deflection waveforms for energizing the respective horizontal and vertical windings of a deflection yoke 20. The deflection yoke 20 is provided to effect suitable deflection of the three electron beams of a three gun shadow mask color kinescope 21 which serves as the color image reproducer of the receiver.

The color kinescope 21 incorporates a phosphor screen 22 made up of a pattern of triads of red, blue, and green light-emitting phosphors. A multiapertured shadow mask 23 is interposed in the path of electrons between the electron gun structure of kinescope 21 and the phosphor screen 22. The angle of approach of an individual electron beam to an aperture in the mask determines which of the phosphors of a respective associated triad will be energized to cause light emission.

The electron gun structure of the color kinescope 21 comprises three separate electron guns arranged to produce respective beams which on proper adjustment of the deflection yoke 20 approach the mask at respectively different angles so as to selectively cause light emission only from respective ones of the triad phosphors. Thus, the electron gun which produces the beam that strikes only the red emitting phosphor of each triad on the screen 22 may be designated as the red electron gun, etc. The red electron gun of color kinescope 21 includes a cathode 24R, a control grid 25R and a screen grid 26R, the latter serving as a first accelerating electrode. The blue and green electron guns comprise similar elements. A commonly energized focus electrode structure 27 is associated with each of the three electron guns. Color kinescope 21 further includes an ultor electrode 28 energized at a high voltage level to supply the final acceleration to the electron beams.

To insure proper convergence of the three beams at the apertured mask 23, a convergence assembly 29 is associated with color kinescope 21 and is energized with suitable dynamic waveforms derived by convergence circuits 30 from waveforms developed in the deflection circuits 18 and 19.

A purity adjustment ring and blue lateral magnet assembly 46 is positioned on the neck of color kinescope 21, the purity ring serving to modify the magnetic field in kinescope 21 for setting purity at the center of phosphor screen 22. Details of the construction and mode of operation of assembly 46 are contained in RCA Victor Color Television Service Data, File 1965, Number T–12, published by RCA Sales Corporation, 600 N. Sherman Drive, Indianapolis, Ind. 46201.

A second output of the video amplifier 16 is supplied to a chrominance channel 31, which conventionally includes suitable apparatus for selecting the modulated color subcarrier component of the composite signal, amplifying the selected signal component, and synchronously detecting the color-representative signals from the amplified, modulated color subcarrier component. Associated with the color subcarrier detecting apparatus of the chrominance channel 31 is a local source of reference oscillations of color subcarrier frequency suitably synchronized in accordance with the color synchronizing component of the composite signal for achieving the desired synchronous detection. The chrominance channel 31 includes suitable matrixing apparatus for combining the detector outputs to achieve production of desired color difference signal outputs. In the illustrated embodiment these outputs comprise three individual color difference signals of the form $R-Y$, $B-Y$, and $G-Y$, appearing respectively at output terminals 32, 33, 34. The color difference signals are supplied to respective grid electrodes of the electron gun structure in color kinescope 21.

Another output of video amplifier 16 is applied to the control electrode of a luminance amplifier 35 using a coupling circuit which includes the usual luminance delay line 36. The amplified luminance signal output of luminance amplifier 35 is applied to the cathode electrodes of the electron gun structure of color kinescope 21 in a manner to be explained more fully below.

Another output of video amplifier 16 is applied to the control electrode of a keyed automatic gain control stage 37. A keying pulse is also applied to AGC stage 37 from the output of horizontal deflection circuit 18. An additional signal-level representative D-C voltage is applied to AGC stage 37 from sound detector 15. The derived AGC signal is applied to both R-F amplifier 11 and I-F amplifier 13 to control the gains thereof in the well known manner.

Details of circuits for performing the functions of the portions of the television receiver shown in block diagram or other simplified form similarly may be found by referring to RCA Victor Color Television Service Data, File 1965, Number T–12, for the RCA color television chassis CTC 17X series.

In effecting proper operation of the color kinescope 21 certain problems arise which are complicated by the multiple gun, multiple phosphor nature of the reproducer. For example, differences in the cut-off characteristics of the three guns, differences in the emission characteristics of the cathodes of the three guns, and differences in efficiencies of the three types of phosphors require that several parameters be adjusted in order to provide proper color and black and white images on the phosphor screen 22. To facilitate such adjustment, a "service switch" 38 is provided in the television receiver. Service switch 38 may be positioned in any one of three positions marked, as is shown in the drawing, "NORM," "SERV," or "RASTER."

The first position is utilized under normal operation to couple the output of luminance amplifier 35 via contacts *a* and *b* and the lower blade (as is shown in the drawing) of switch 38 to the cathodes of color kinescope 21.

The second position of service switch 38 is utilized for adjustment of the operating characteristics, i.e., "KINE BIAS," screen potentials and "DRIVE," of the three electron guns associated with color kinescope 21. When the switch 38 is placed in the "SERV" position the vertical deflection circuit 19 is disabled, i.e., the grid of the vertical output stage 39 is connected to ground at terminal *f* of switch 38 by means of conductor 40 connected to terminal *g* and the upper blade of switch 38. A horizontal line is therefore produced across the middle of phosphor screen 22. The contacts *b* and *c* of switch 38 are arranged substantially to prevent application of the video output of luminance amplifier 35 to the cathodes of color kinescope 21 and to apply, in its place, a fixed direct voltage provided at the terminal 46 to the cathodes of kinescope 21 thereby permitting adjustment of the kinescope bias and screen operating potentials substantially without interference from variations in broadcast program material. The voltage provided at terminal 46 is selected equal to or slightly less positive than the potential applied to the kinescope cathodes when luminance amplifier 35 commences conduction. The details of the manner in which such color temperature adjustments may be made are described in the above-referenced RCA Service Data, File 1965 Number T–12.

In accordance with the present invention, the service switch 38 is provided with a third position labelled "RASTER" to facilitate checking and final adjustment of the position of deflection yoke 20 and purity ring assembly 46 to achieve the desired color "purity" of the image produced on phosphor screen 22. It is desirable, when checking and making final adjustments for color purity, to provide a static (nonchanging) display having substantially areas of equal brightness on the phosphor screen 22 of kinescope 21. It is particularly desirable to have a reasonably bright, static area at the center of screen 22 to be able to ascertain that purity ring assembly 46 is properly adjusted. While a broadcast "test pattern" may be utilized for purity checking, such broadcast material normally is not available during a major portion of the day.

In accordance with the present invention, a blank raster (i.e., no image) of substantially uniform brightness is produced upon screen 22 when service switch 38 is placed in the "RASTER" position. The entire received composite television signal including luminance, chrominance, sound and synchronization components is prevented from reaching ultimate utilization devices in the receiver in the following manner. When switch 38 is placed in the "RASTER" position, the contact *e* is coupled to ground at contact *f* by means of the upper blade of switch 38. Contact *e* is coupled by means of a resistor 45 to the wiper of an adjustable resistance "AGC LEVEL" control 41. A voltage divider comprising a second resistor 42, the portion of AGC LEVEL control 41 below the wiper arm and an AGC limit resistor 43 is coupled across a positive voltage supply (+) and provides at the wiper arm of AGC LEVEL control 41 an adjustable input circuit (grid to cathode) bias for AGC stage 37. The position at which the wiper arm of control 41 is set determines the voltage level at which AGC stage 37 conducts to initiate AGC influence upon the operation of the R-F amplifier 11 and I-F amplifier 13. The value of resistor 45 is selected with respect to the other components comprising the above-described voltage divider such that, upon movement of service switch 38 to the "RASTER" position, AGC stage 37 conducts sufficiently to apply an AGC effect (a substantially fixed negative voltage) to amplifiers 11 and 13 to completely cut off such amplifiers. No signal passes through either R-F amplifier 11 or I-F amplifier 13 under these conditions. However, the deflection circuits 18 and 19 continue to operate and provide desired retrace blanking signals to chrominance channel 31 and video amplifier 16, respectively. Luminance amplifier 35 provides substantially constant direct voltage to all three cathodes of kinescope 21, the magnitude of this voltage and therefore brightness of the raster being controllable by means of the brightness variable resistor 44 coupled to the control grid of luminance amplifier 35.

In accordance with the usual purity adjustment procedure, the blue and green electron guns are adjusted to cut-off (e.g., turn blue and green screen controls to minimum position to extinguish blue and green beams). Assuming center convergence to be correctly adjusted, the entire phosphor screen 22 should appear as a substantially uniform red. If there is any variation from the desired uniform red, purity magnet assembly 46 may be adjusted to obtain uniform red in the center of screen 22 and then deflection yoke 20 may be positioned along the neck of kinescope 21 in the standard manner to obtain the desired overall uniform red field on phosphor screen 22. If necessary, the brightness of the red field may be adjusted for convenience of observation by means of brightness control 44.

Upon completion of the final purity adjustment, service switch 38 then may be placed in the "SERV" position for readjustment of the blue and green screen controls for proper color temperature. The service switch 38 then may be returned to the "RASTER" position to check the grey scale "tracking" of the color temperature as brightness control 44 is varied over its entire range. The switch 38 then may be returned to its NORM position for normal operation of the receiver.

It should be noted that provision of the "RASTER" function on switch 38, in addition to permitting simple purity adjustments when required also permits a rapid, simple means for checking purity in diagnosing and isolating service problems in the receiver.

We claim:

1. In a color television receiver including a color image reproducing kinescope, means for receiving and amplifying composite television signals, automatic gain control means coupled to said amplifying means for controlling the gain thereof in accordance with received signal levels, means coupled to said amplifying means for deriving from said composite television signals image-representative components and output means for amplifying said image-representative components for application to said kinescope, control apparatus comprising:

means coupled to said automatic gain control means for selectively placing said gain control means in a normal signal-level responsive condition for controlling the gain of said amplifying means according to received signal levels, and purity testing means for selectively placing said gain control means in a substantially fixed output operating condition for maintaining said amplifying means in cutoff condition for all signal levels to substantially prevent application of image-representative components of received television signals to said kinescope while coupling said output means to said kinescope thereby permitting operating tests of said kinescope without interference from received television program material.

2. In a color television receiver, control apparatus according to claim 1 comprising:

switching means for placing said gain control means in signal-level responsive condition for normal reception of broadcast program material and for placing said gain control means in said substantially fixed output operating condition for kinescope purity checking and adjustment tests substantially without interference from broadcast program material.

3. In a color television receiver including a color image reproducing kinescope wherein said kinescope includes plural electron beam producing apparatus and said receiver further includes means for deflecting the plural electron beams within said kinescope in a pair of substantially mutually perpendicular directions, means for receiving and amplifying composite television signals, automatic gain control means coupled to said amplifying means for controlling the gain thereof in accordance with received signal levels, and means coupled to said amplifying means for deriving from said composite television signals image-representative components for application to said kinescope, control apparatus comprising:

means coupled to said automatic gain control means for selectively placing said gain control means in a normal signal-level responsive condition for controlling the gain of said amplifying means according to received signal levels and in a substantially fixed output operating condition for maintaining said amplifying means in a cutoff condition for all signal levels, said control apparatus comprising switching means having a first position for coupling said signal deriving means to said kinescope for normal image-reproducing operation of said receiver, a second position for substantially uncoupling at least a portion of the output of said signal deriving means from said kinescope, substituting therefor a reference potential and simultaneously disabling operation of said deflection means in one of said directions to permit color temperature adjustment of said kinescope, and a third position for recoupling said signal deriving means to said kinescope and simultaneously placing said gain control means in said fixed output operating condition to permit purity adjustment of said kinescope, whereby application of image-representative components of received television signals to said kinescope is substantially prevented thereby permitting operating tests of said kinescope without interference from received television program material.

4. In a color television receiver, control apparatus according to claim 3 wherein:

said third position of said switching means further provides reactivation of said deflection means to provide a full raster for purity adjustment purposes.

5. In a color television receiver according to claim 4, said automatic gain control means comprising an electronic amplifying device and a variable resistance input bias control coupled to said device, said control apparatus comprising a relatively low valued resistance associated with said third position of said switching means arranged to be coupled across said bias control resistance by said switching means to place said gain control means in said fixed output operating condition.

6. In a color television receiver according to claim 5, said low valued resistance being selected to bias said electronic amplifying device to a conduction state sufficient to provide to said television signal amplifying means an automatic gain control effect to cut-off said amplifying means.

7. In a color television receiver, control apparatus in accordance with claim 1 and further comprising:

variable brightness control means coupled to said output means operative to vary brightness level at said kinescope at least when said gain control means is in said substantially fixed output operating condition for testing grey scale tracking of said receiver.

References Cited

UNITED STATES PATENTS

| | | | |
|---|---|---|---|
| 2,837,636 | 6/1958 | Richard | 325—363 |
| 3,114,796 | 12/1963 | Stark et al. | 178—5.4 |

RICHARD MURRAY, Primary Examiner

U.S. Cl. X.R.

178—6